United States Patent
Kaleeswaran et al.

(10) Patent No.: US 12,348,366 B2
(45) Date of Patent: Jul. 1, 2025

(54) DETECTION OF CONTINUOUS REPLACEMENT OF HOSTS ON PORTS OF NETWORK DEVICES

(71) Applicant: Arista Networks, Inc., Santa Clara, CA (US)

(72) Inventors: Shalini Kaleeswaran, Bengaluru (IN); Ronak Upadhyay, Bengaluru (IN); Aaranya Prasad, Lucknow (IN)

(73) Assignee: ARISTA NETWORKS, INC., Santa Clara, CA (US)

(*) Notice: Subject to any disclaimer, the term of this patent is extended or adjusted under 35 U.S.C. 154(b) by 166 days.

(21) Appl. No.: 18/188,906

(22) Filed: Mar. 23, 2023

(65) Prior Publication Data
US 2024/0323080 A1    Sep. 26, 2024

(51) Int. Cl.
*H04L 41/0816* (2022.01)
*H04L 9/40* (2022.01)
*H04L 41/069* (2022.01)

(52) U.S. Cl.
CPC ........ *H04L 41/0816* (2013.01); *H04L 41/069* (2013.01); *H04L 63/08* (2013.01)

(58) Field of Classification Search
CPC ............................ H04L 41/0816; H04L 41/069
USPC ........................................................ 709/221
See application file for complete search history.

(56) References Cited

U.S. PATENT DOCUMENTS

| | | | |
|---|---|---|---|
| 7,216,161 B1 | 5/2007 | Peckham et al. | |
| 9,071,660 B1 * | 6/2015 | Seshadri | H04L 65/4061 |
| 2005/0055570 A1 * | 3/2005 | Kwan | H04L 63/102 |
| | | | 726/4 |

FOREIGN PATENT DOCUMENTS

| | | |
|---|---|---|
| CN | 101189892 A | 5/2008 |
| CN | 104823412 A | 8/2015 |

OTHER PUBLICATIONS

Cisco, Catalyst 2960-X Switch Security Configuration Guide, Cisco IOS Release 15.0(2)EX, Jul. 10, 2013, https://www.cisco.com/c/en/us/td/docs/switches/lan/catalyst2960x/software/15-0_2_EX/security/configuration_guide/b_sec_152ex_2960-x_cg/b_sec_152ex_2960-x_cg_chapter_0100.html (Year: 2013).*

Cisco Community, 802. 1x authentication host-mode on switch, Aug. 1, 2019, https://community.cisco.com/t5/network-access-control/ 02-1x-authentication-host-mode-on-switch/td-p/3901802#:~:ext=When%20you%20enable%20port%20security,that%20can%20access%20the%20network. (Year: 2019).*

European Search Report issued by the European Patent Office for European Patent Application No. 24162305.7, mailed Sep. 10, 2024, 7 pages.

Cisco Systems Ed—Cisco Systems: "Cisco Nexus 7000 Series NX-OS Security Configuration Guide, Chapter 8: Configuring 802.1 X; Chapter 9: Configuring NAC", Internet Citation, Apr. 27, 2009, P002659623, [Retrieved from <<http://www.cisco.com/en/us/docs/switches/datacenter/sw/4_1 /nx- os/security/configuration/guide/sec_nx-os.pdf>> on Sep. 21, 2011], 82 pages.

(Continued)

*Primary Examiner* — Zi Ye
(74) *Attorney, Agent, or Firm* — Sprinkle IP Law Group (57) ABSTRACT

Systems and methods for detecting when continuous session replacement is occurring on a port at a network device, such as ports configured in a single host mode. One or more continuous session replacement actions may be taken when such continuous session replacement is detected, including notifying a user or disabling the port.

19 Claims, 4 Drawing Sheets

(56) References Cited

OTHER PUBLICATIONS

Ruckus Commscope: "Supporting FastIron Software Release 09.0.1 0", Oct. 10, 2022, XP093140824, [Retrieved from <<https://support.alcadis.nl/Support_files/Ruckus/ICX//Software%20Manuals/Ruckus%20ICX%20FastIron%20v09.0.10d/fastiron-09010- securityguide.pdf>> on Mar. 13, 2024], 498 pages.

* cited by examiner

FIG. 4

DETECTION OF CONTINUOUS REPLACEMENT OF HOSTS ON PORTS OF NETWORK DEVICES

BACKGROUND

Security in computer networks is becoming more critical and complex as networks are increasingly relied upon for communications in a variety of applications and settings. In most network architectures, security on these networks involves the authentication of devices or users using some security mechanism or protocol.

The authentication of such devices or messages is typically accomplished using an authentication protocol, where that authentication protocol is implemented using one or more authentication servers. One example of such a protocol is Remote Authentication Dial-In User Service (RADIUS).

Generally, during an authentication session, a host connected to a port of a network device will attempt to authenticate through the network device. The network device can then send an authentication request (e.g., an access request, etc.) to the authentication server based on the host attempting to authenticate through the port. The authentication server can then return an authentication response.

Typically, each of the ports of the network device may be configured in a single host mode or multiple host mode. When a port is operated in single host mode once a host is authenticated on the port, only traffic coming from that particular host is allowed through that port; no other host can be authenticated on that port unless the currently authenticated host logs off. While single host mode may have certain advantages (e.g., increased security), applying single host mode to a port may also introduce certain problems. In scenarios where an authenticated host gets disconnected from such a single host mode port without sending an explicit logoff message to the network device, in certain cases no other host may be allowed to connect on the port. Alternatively, network devices may be adapted to allow a new host to immediately connect to a port in single host mode without needing a previously authenticated supplicant on the single mode port to logoff. This configuration may be problematic. If there are multiple active hosts on a single host mode port, sessions for each host may be continuously replaced with sessions for subsequently arriving hosts.

What is desired, then, is to detect continuous session replacement with respect to ports of a network device and take associated ameliorative, or other, actions based on such a detection.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

As discussed, security in computer networks is becoming more critical and complex as networks are increasingly relied upon for communications in a variety of applications and settings. In typical network architectures, devices (hosts) communicating in the network are connected to a network interface of a network device, such as a router or switch, which controls the flow of packets in the network. These network devices may thus be utilized to control access to such networks.

Security in computer networks is becoming more critical and complex as networks are increasingly relied upon for communications in a variety of applications and settings. In typical network architectures, devices (hosts) communicating in the network are connected to a network interface of a network device, such as a router or switch, which controls the flow of packets in the network. These network devices may thus be utilized to control access to such networks.

To give an example, one type of networked environment in which network devices may be effectively utilized to control access is referred to as a "campus" environment. A campus network can be thought of as a proprietary local area network (LAN) (or set of interconnected LANs) serving a university, corporation, government agency, or other organization or entity. Oftentimes in these sorts of network environments users desire to join, or access, the campus network, and do so through a network device in the campus network. For example, users in a conference room or classroom may access a campus network through a wired or wireless interface provided by a network device in the network.

In these types of scenarios, campus (or other types of) networks typically have some form of authentication or validation in place. This authentication can be done using authentication, authorization, and accounting (AAA), a widely used standard-based framework for controlling who is permitted to use network resources (through authentication), what they are authorized to do (through authorization), and capturing the actions performed while accessing the network (through accounting). In particular, many of these networks may authenticate users according to IEEE 802.1X, an authentication protocol to allow access to networks using an authentication server.

Hosts (e.g., users at host devices) may thus access the (e.g., campus) network through a network device (e.g., a router or switch) serving as an authenticator. The network device can authenticate the host device using the authentication server based on credentials provided by the host device and allow, block, or otherwise control network traffic between the host and the network based on the result of the authentication. Remote Authentication Dial-In User Service (RADIUS) is one example of a protocol that can be used by such an 802.1X authenticator to validate a user (referred to as an 802.1X supplicant, or just supplicant) by communicating with an AAA server (the RADIUS server) in an 802.1X topology. It can also be used to validate local authentication attempts.

Generally, during an authentication session, a supplicant connected to a port of the network device will attempt to authenticate with the network device using an Extensible Authentication Protocol (EAP) over LAN (EAPoL) message or the like. The network device can then send an authentication request (e.g., an access request, etc.) to the authentication server when based on the host attempting to authenticate through the port. The authentication server can then return an authentication response (e.g., an access-accept response, access-reject, access-challenge response, etc.).

To illustrate in more detail, when authenticating a supplicant, a network device can generate a RADIUS Access-Request message with several properties describing the supplicant, and with a property wrapping a supplicant's Extensible Authentication Protocol (EAP) message. The server then generates a RADIUS response (which may be a challenge), potentially with a wrapped Extensible Authentication Protocol (EAP) response for the supplicant. Based on the result of the authentication, the supplicant may, or may not be, granted access to the network through the port on which it is connected. When access is granted the authenticated session at the network device to allow the supplicant to access the network.

Accordingly, each supplicant must authenticate with the network device (e.g., using an EAPoL message) before the supplicant can gain full access to the network through the port to which it is connected. The network device acts as an authenticator, passing the messages from supplicants through to the RADIUS authentication server and vice versa. In association with this 802.1X authentication, each of the ports of the network device may be configured in a single host mode or multiple host mode. When a port is operated in single host mode once a supplicant is authenticated on the port, only traffic coming from that particular supplicant (e.g., the media access control (MAC) address of the supplicant) is allowed through that port. In multi host mode, traffic originating from multiple (e.g., authenticated) supplicants may be allowed through the port.

Thus, when a port is configured in single host mode only one supplicant may be authenticated for that port. Once a supplicant is successfully authenticated, only traffic of that single successfully authenticated supplicant is allowed through that port; no other supplicant can be authenticated on that port unless the currently authenticated supplicant logs off. While single host mode may have certain advantages (e.g., increased security), applying single host mode to a port may also introduce certain problems. In scenarios where an authenticated supplicant gets disconnected from such a single host mode port without sending an explicit logoff message to the network device, no other supplicant may be allowed to connect on the port. The port may be effectively locked by the network device. In these circumstances a user may have to explicitly clear the port using the operating system of the network device before another supplicant can connect to this port. As may be realized, such a situation may be quite inconvenient.

Accordingly, to prevent such scenarios from occurring, a network device may support a session replace feature that allows a new supplicant to immediately connect to a port in single host mode without needing a previously authenticated supplicant on the single mode port to logoff. This session replace feature may operate by attempting to authenticate any newly arriving supplicant, and replacing the current session of the supplicant with a new session for the newly appearing supplicant on the port. In this manner, the port remains a single host mode port (e.g., only traffic from a single host is allowed through the port), but when a new supplicant appears on the port, the current session of the previous supplicant may be replaced with the session of the new supplicant without action by (e.g., administrative) users of the network device.

Such a feature is intended to operate in limited circumstances where an authenticated supplicant is disconnected from a single host mode port without the knowledge of the operating system of the device and a new supplicant connects to this single host mode port. This feature may, however, be problematic in other operating scenarios. For example, if there are multiple active supplicants on a single host mode port the session replace feature would continuously attempt to authenticate each newly arriving supplicant and continuously replace the session of any current supplicant with the session of the newly appearing supplicant.

In these cases, no supplicant can establish and maintain an authenticated session on the port (e.g., as the current session for one supplicant will be continuously replaced when a subsequent supplicant appears on the port). Thus, each time a supplicant (re)appears on the port it will again be required to authenticate with the network device (e.g., as any previously established session for that supplicant has been replaced). Accordingly, this situation is additionally problematic as it causes the network device to continuously process all the authentication requests sent by the supplicants as they attempt these repeated authentication (e.g., to continuously attempt authentication with the RADIUS server in the network).

What is desired then, is to allow such a session replace feature to be utilized while curtailing or ameliorating the negative effects of such a session replacement configuration by detecting such continuous session replacement with respect to single host ports, and taking certain actions with respect to such ports when such continuous session replacement is detected.

To address those desires, among others, embodiments may automatically detect when continuous session replacement is occurring on a port at a network device (e.g., a port configured in single host mode). Moreover, embodiments may automatically take one or more continuous session replacement actions when such continuous session replacement is detected. These actions may, for example, include notifying a user (e.g., by outputting (writing) an error message to an error log, raising an alarm, etc.) or disabling the port.

In particular, embodiments of network devices may track session replacement events associated with a port at a network device (e.g., a port of the network device configured as a single host port). Specifically, when a session replacement event occurs on the port (e.g., a current session associated with a supplicant on a port is replaced with another session), a number of session replacements associated with the port may be incremented or the like. For example, a session replacement counter associated with the port may be incremented. When the number of session replacement events exceeds a session replacement threshold, continuous session replacement may be detected in association with the port.

In certain embodiments the number of session replacements tracked for the port may be reset or cleared at a certain interval (e.g., time period) such that continuous session replacement is detected only if the number of session replacement events within the interval exceeds the session replacement threshold. For example, a timer adapted to time a session replacement interval for the port may be utilized, where the session replacement counter for the port may be reset at the expiration of this timer. Accordingly, when a session replacement event occurs the timer may be started if it is not already running, and a session replacement counter incremented. A session replacement for the port may occur, for example, if another supplicant attempts to authenticate on the port. Such an authentication may be performed, for example, through the use of EAPoL messages, using Media Access Control (MAC) address based authentication, or utilizing another type of authentication. If the session replacement counter for the port exceeds the session replacement threshold a continuous session replacement action can be taken. At the expiration of the timer (e.g., when the timer is equal to or greater than the time interval), the session replacement counter for the port is reset along with the timer. The session replacement timer can then be started again at the occurrence of the next session replacement event associated with the port.

In this manner, continuous session replacement on a port may be detected and a continuous session replacement action taken based upon such detection. Specifically, this continuous session replacement action may include outputting (writing) one or more statements to a system log or error log indicating that there is continuous session replacement associated with the port (e.g., to inform a user of the continuous session replacement issue). Here, the network device may continue to process packets from all the supplicants connected to the port and session replacement may continue (e.g., until a user of the network device takes action, such as reconfiguring the port or disconnecting unwanted supplicants on the port).

Alternatively or additionally, other actions may be taken. For example, a continuous session replacement action may include disabling the port. Moreover, in this case the continuous session replacement action may include automatically recovering the port after a (e.g., configurable) period of time (referred to as the port recovery time period). In instances where the port is disabled, the network device may not process packets from supplicants on the port until the port is linked up again, thus avoiding unwanted, redundant, or extraneous processing of traffic from multiple supplicants on the port. As such embodiments may provide for the automatic detection and flexible handling and remediation of continuous session replacement on individual ports. For example, users may configure the network device to simply output notifications of the situation, to disable the port, or to disable the port for a limited period of time and then attempt reactivation of the port.

Before describing embodiments in more detail, it may be helpful to an understanding of embodiments to generally discuss the operation of embodiments of such network devices in a network environment, including authentication in such a network environment. It should be noted that while embodiments as described and disclosed herein are described and presented with respect to authentication of hosts using the RADIUS protocol, embodiments may be effectively applied in almost any computing context where authentication using remote authentication servers is utilized, and all such embodiments are fully contemplated herein.

Figure 1:
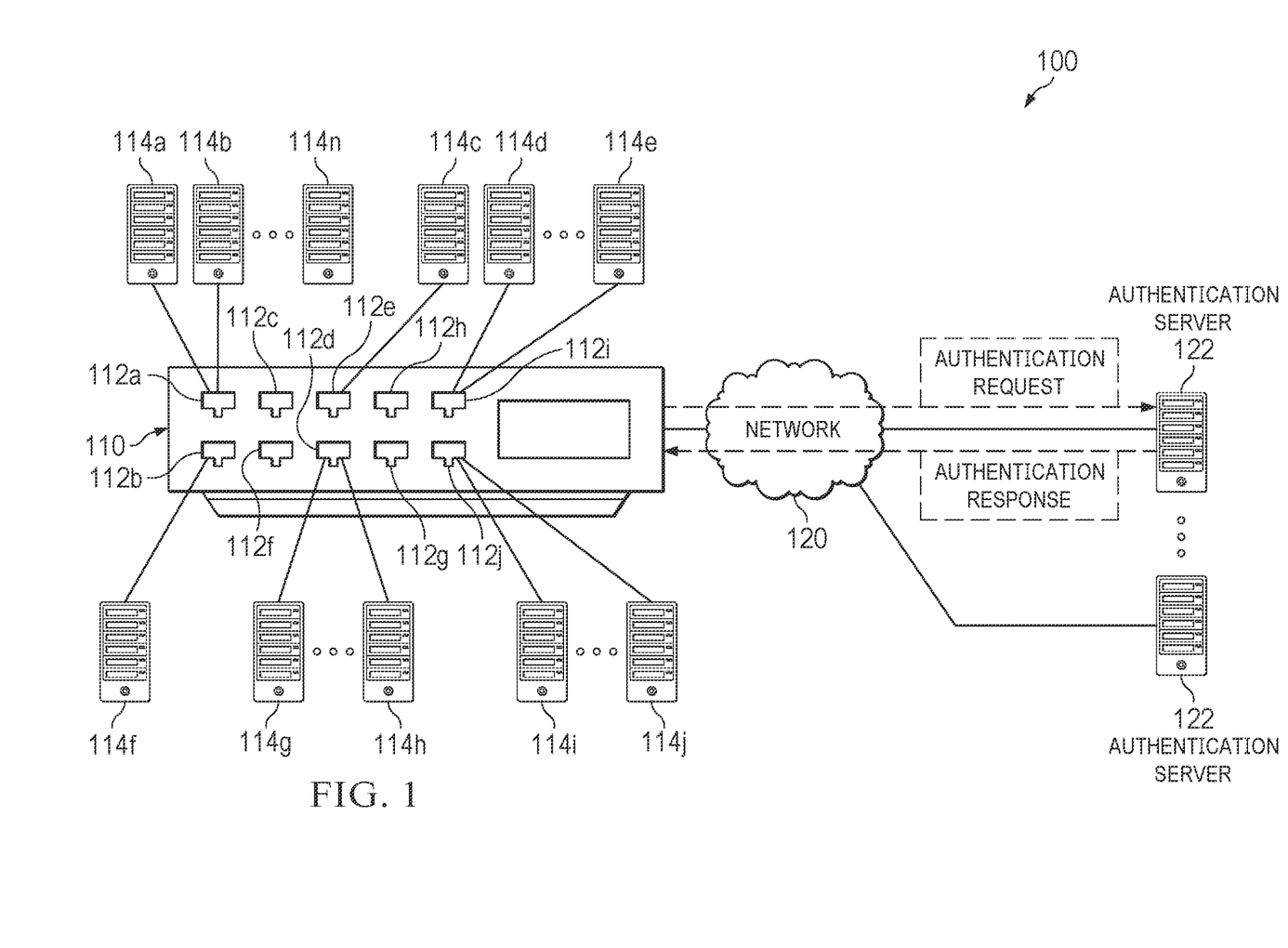
FIG. 1 is a block diagram illustrating a network environment including an embodiment of a network device and authentication servers.

Referring then to FIG. 1, network environment 100 includes network device 110 (such as a switch or a router) comprising a plurality of network interfaces (ports) 112 (e.g., 112a, 112b, 112c, 112d, 112e, 112f, 112g, 112h, 112i and 112j) to which hosts 114 (e.g., hosts 114a, 114b, 114c, 114d, 114e, 114f, 114g, 114h, 114i, 114j and 114n) are connected (e.g., through a wired or wireless connection) to access network 120. Network device 110 controls the flow of packets from hosts 114 into and out of network device 110 and onto network 120.

Embodiments of network device 110 can be usefully applied in certain network environments, such as when network device 110 is utilized as an authenticator in network environment 100. Here, in order to gain access to network 120, hosts 114 need to be authenticated. Network device 110 serves as an authenticator in network environment 100 to authenticate these hosts 114 using an authentication server 122 (such as a RADIUS server or the like) and can control network traffic between hosts 114 and network 120 based on the result of the authentication. Generally, during an authentication session, network device 110 sends an authentication request (e.g., an access request, etc.) to authentication server 122 when a host 114 is attempting to access network 120. That authentication server 122 can then return an authentication response (e.g., an access-accept response, access-reject, access-challenge response, etc.). To illustrate in more detail, when authenticating a host 114 (e.g., a user at the host 114b), network device 110 can generate a RADIUS Access-Request message with several properties describing that host 114 (referred to herein also as a supplicant without loss of generality). Server 122 then generates a RADIUS response (which may be a challenge), potentially with a wrapped EAP-response for the host 114.

These RADIUS messages have authentication fields (e.g., the Request/Response Authenticator and the Message-Authenticator attribute) that are calculated using a mathematical function such as an MD5 hash or the like. The values for these authenticator fields may be generated using a secret (value) shared between network device 110 and authentication server 122. Specifically, the shared secret (also referred to as a key) is appended to the contents of a message (e.g., packet) and the result hashed to produce the value for the authenticator field.

According to the RADIUS protocol, then, network device 110 or authentication server 122 must validate messages passing between them based on this shared secret when appropriate conditions are met and will drop packets if their authentication field doesn't match what is locally calculated. The RADIUS protocol also specifies that the authenticator value may be generated on a per-packet basis. In request messages, the generation of the authenticator field (e.g., the hash) is based only on the message itself and the shared secret, or is unilaterally generated and cannot be checked (e.g., depending on the type of the message). In replies, the authenticator field (e.g., the hash) is based on the authenticator field of the corresponding request being replied to and the shared secret.

Based on the result of the authentication, host 114 may, or may not be, granted access to the network through the network interface (port) 112 on which it is connected. When access is granted, an authenticated session may be established at the network device for host 114 to allow the host to access network 120.

In association with this type of authentication, each of the ports 112 of the network device may be configured in a single host mode or multiple host mode. When a port 112 is operated in single host mode once a host 114 is authenticated on the port 112, only traffic coming from that particular host 114 (e.g., the media access control (MAC) address of the supplicant) is allowed through that port 112. In multi host mode, traffic originating from multiple (e.g., authenticated) hosts 114 may be allowed through port 112.

Thus, when a port 112 is configured in single host mode at network device 110 only one host 114 session replacement configuration of that single successfully authenticated host 114 is allowed through that port 112; no other host 114 can be authenticated on that port 112 unless the currently authenticated host 114 logs off.

Network device 110 may support a session replace feature that allows a new host 114 to immediately connect to a port in single host mode without needing a previously authenticated host 114 on the single mode port to logoff. This session replace feature may operate by attempting to authenticate any newly arriving host 114 (e.g., host 114b) and replacing the current session of host 114 (e.g., host 114a) with a new session for the newly appearing host 114 (e.g., host 114b) on port 112 (e.g., port 112a). In this manner, port 112 (e.g., port 112a) remains a single host mode port (e.g., only traffic from a single host is allowed through the port), but when a new host 114 (e.g., host 114b) appears on the port, the current session of the previous host 114 (e.g., host 114a) may be replaced with the session of the new host 114 (e.g., host 114b) without action by (e.g., administrative) users of the network device.

This session replace feature may, however, be problematic in other operating scenarios. For example, if there are multiple active supplicants on a single host mode port the session replace feature may continuously attempt to authenticate each newly arriving host 114 and continuously replace the session of any current supplicant with the session of the newly appearing host 114.

To illustrate, if port 112a is a single host mode port and network device 110 has a session replace feature enabled, host 114a may initially connect to the port 112a and be authenticated such that a session is established on network device 110 for that host 114a on port 112a. If host 114b subsequently connects to port 112a, as the session replace feature is enabled, the current session of the host 114a associated with port 112a may be replaced with a session for the new host 114b. Similarly, if host 114n subsequently connects to port 112a, the current session of the host 114b associated with port 112a may be replaced with a session for the host 114n. When host 114a attempts to reconnect, this session for host 114n at the network device 110 will get replaced with a session for host 114a. This session replacement will thus continue as long as multiple hosts 114a, 114b, 114n continue to connect to the single host mode port (e.g., or until the session replacement feature is disabled to network device 110).

In these cases, no host 114a, 114b, 114n can establish and maintain an authenticated session on the port 112a (e.g., as the current session for one host 114a, 114b, 114n will be continuously replaced when a subsequent supplicant appears on the port 112a). Thus, each time a host 114a, 114b, 114n (re)appears on the port 112a it will again be required to authenticate with the network device 110 (e.g., as any previously established session for that host 114a, 114b, 114n has been replaced). Accordingly, this situation is additionally problematic as it causes the network device 110 to continuously process all the authentication requests sent by the host 114a, 114b, 114n as they attempt these repeated authentication (e.g., to continuously attempt authentication with the RADIUS server in the network).

Network device 110 may thus be adapted to detect such continuous session replacement with respect to single host ports, and taking certain actions with respect to such ports when such continuous session replacement is detected. As such, network device 110 may allow a session replace feature to be utilized while curtailing or ameliorating the negative effects of such a session replacement configuration.

Specifically, network device 110 may automatically detect when continuous session replacement is occurring on a port 112 (e.g., a port configured in single host mode) and automatically take one or more continuous session replacement actions when such continuous session replacement is detected. These actions may, for example, include notifying a user (e.g., by writing to an error log, raising an alarm, etc.) or disabling the port 112.

To detect continuous session replacement on a (e.g., single host mode) port 112 (e.g., port 112a), network device 110 may track session replacement events associated with the port 112 (e.g., port 112a). When a session replacement occurs on the port 112 (e.g., port 112a) (e.g., a current session associated with a host 114a, 114b, 114n on port 112a is replaced with another session), a number of session replacements (associated with the port 112) may be incremented or the like. For example, a session replacement counter associated with that port 112 (e.g., port 112a) may be incremented. When the number of session replacements exceeds a session replacement threshold, continuous session replacement may be detected in association with the port 112 (e.g., port 112a). A continuous session replacement action such as notifying a user (e.g., by writing to a system log) or disabling the port 112 (e.g., disabling port 112a) may be taken.

Figure 2:
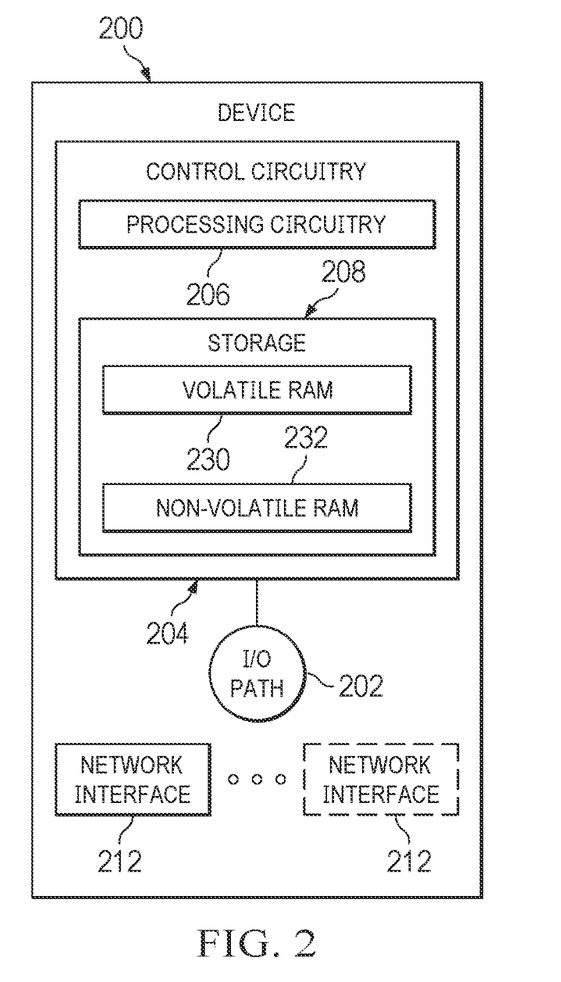
FIG. 2 is a block diagram depicting a general architecture of one embodiment of a network device for detection of continuous session replacement on ports of a network device.

FIG. 2 is a block diagram depicting a general architecture of a network device for detecting continuous session replacement on a port and taking a session replacement action based on that detection. Network device 200 may be a router, switch, server, or any other computing device that may be configured to control or process network traffic. Network device 200 may receive data, including packets from hosts (not shown), via input/output (I/O) path 202. I/O path 202 may provide packet data to control circuitry 204, which includes processing circuitry 206 and storage (i.e., memory) 208. Control circuitry 204 may send and receive commands, requests, and other suitable data using I/O path 202. I/O path 202 may connect control circuitry 204 (and specifically processing circuitry 206) to one or more network interfaces (ports) 212 to which other devices of a network (e.g., hosts) can be connected. These ports 212 may be any type of network interface, such as an RJ45 ethernet port, a coaxial port, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units or multiple different processors. The circuitry described herein may execute instructions included in software running on one or more general purpose or specialized processors.

Storage 208 may be an electronic storage device that includes volatile random-access memory (RAM) 230, which does not retain its contents when power is turned off, and non-volatile RAM 232, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

According to embodiments, various configurations for continuous session detection may be stored in storage 208. For example, such configurations may include, a continuous session replacement action indicating an action to be taken when continuous session replacement is detected on a port (e.g., writing a session replacement error to a system log, disabling the port, raise another type of alarm, etc.); a session replacement threshold comprising a threshold number of session replacement events for determining if continuous session replacement is detected; a port recovery time period comprising a time period after which a port should be recovered in instances where port recovery is to be attempted after a port is disabled; a timer configuration comprising a session replacement time interval after which a session replacement counter for a port is to reset; or other configurations associated with the detection of continuous session replacement. Such configurations can be established by an administrative or other type of user through an interface such as a command line interface (CLI) or the like provided by the network device 200.

Control circuitry 204 executes instructions for detecting continuous session replacement and taking continuous session replacement actions when such continuous session replacement action is detected for a port. The control circuitry 204 can detect such continuous session replacement using a session replacement counter associated with each port 212 and incrementing the corresponding session replacement counter when a session replacement takes place on a port 212. When the session replacement counter for a port 212 exceeds a session replacement threshold configured in device storage 208 (e.g., using a CLI or the like), continuous session replacement on that port 212 may be detected.

Thus, in embodiments the control circuitry 204 may maintain a session replacement counter for each port of the network device 200 (e.g., each port 212 that is configured in single host mode). The control circuitry 204 is adapted to monitor session replacement events for those ports 212. When a session replacement occurs for a port 212 the control circuitry 204 can increment the session replacement counter associated with that port 212. Additionally, the control circuitry 204 can determine if a session replacement timer associated with that port is running. If no session replacement timer corresponding to that port 212 is running, the session replacement timer may also be started by control circuitry 204. Control circuitry 204 can compare the session replacement counter associated with the port 212 to a session replacement threshold configured in device storage 208. When the session replacement counter associated with the port 212 exceeds the session replacement threshold continuous session replacement on the port 212 may be detected and a session replacement action by control circuitry 204. Control circuitry 204 may reset (e.g., clear) the session replacement counter and the time for the port 212 at the expiration of a (session replacement) time interval configured on the device 200. In other words, when the configured time interval has passed (e.g., as determined from the timer for the port 212), the timer associated with port 212 will be stopped and reset (e.g., cleared or reset to zero) and the session replacement counter associated with the port 212 reset (e.g., cleared or reset to zero).

Figure 3:
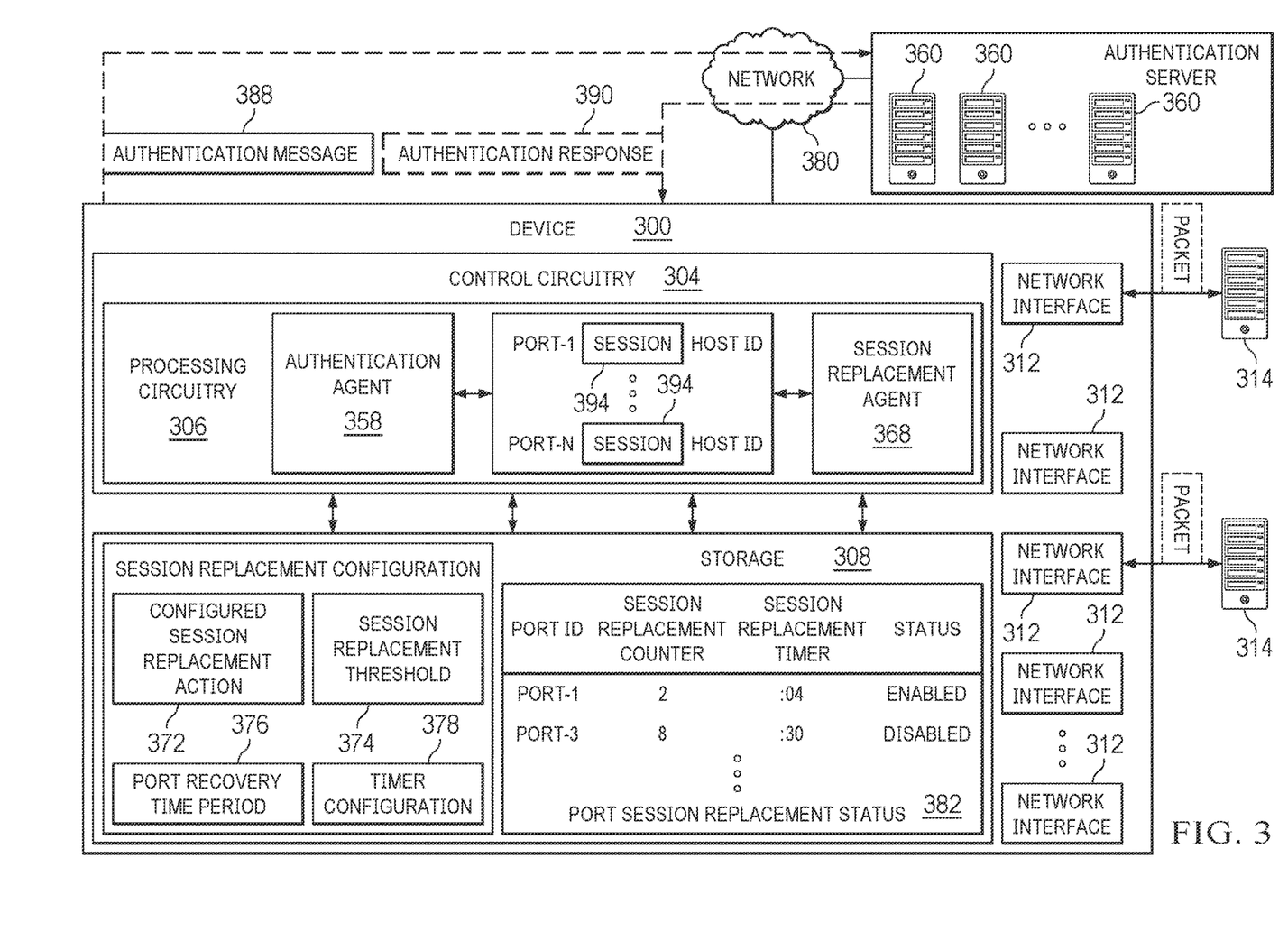
FIG. 3 is a block diagram of one embodiment of a network system including an embodiment of a network device for detection of continuous session replacement on ports of a network device.

FIG. 3 is a more detailed depiction of an embodiment of a network system including network device 300 and one or more authentication servers 360 where network device 300 serves as an authenticator in the networked environment. In particular, authentication agent 358 authenticates hosts 314 connected to network interfaces (ports) 312 of the network device 300 to establish sessions 394 for those hosts 314 at the network device. Session replacement agent 368 tracks the replacement of sessions 394 associated with ports 312 of the network device 300 and detects continuous session replacements associated with those ports 312. Authentication agent 358 and session replacement agent 368 may be implemented in hardware, software, or any suitable combination of hardware and software (e.g., in control circuitry 304). For example, authentication agent 358 and session replacement agent 368 may be software programs stored on storage 308 (e.g., non-volatile RAM) and executed by processing circuitry 306.

In certain embodiments, authentication agent 358 may be adapted to authenticate hosts 314 connected to network interfaces (ports) 312 using the set of authentication servers 360 based on credentials provided by hosts 314 such that network device 300 can allow, block, or otherwise control network traffic between the hosts 314 and network 380 based on the result of the authentication. Such an authentication may be performed, for example, through the use of EAPoL messages, using Media Access Control (MAC) address based authentication, or utilizing another type of authentication. Authentication servers 360 may be a RADIUS server or the like configured to receive authentication messages 388 (e.g., authentication requests or the like) from network device 300 and return authentication messages 390 (e.g., authentication responses or the like).

When a host 314 connects to a port 312 and is authenticated by authentication agent 358, a session 394 may be established for that host 312 at the network device 300. This session 394 is thus established with respect to an associated port 312 and host 314. As discussed, certain of the ports 312 of network device 300 may be single host ports where the port 312 is configured in a single host mode at the network device 300 such that only one host 314 may be authenticated for that port 312. Once a host 314 is successfully authenticated, only traffic of that single successfully authenticated host 314 is allowed through that port 312; no other host 314 can be authenticated on that port 312 unless the currently authenticated host 114 logs off. Network device 300 may also support a session replace feature that allows a new host 314 to immediately connect to a port 312 in single host mode without needing a previously authenticated host 314 on the single mode port to logoff. To implement this session replace feature, authentication agent 358 may operate by attempting to authenticate any newly arriving host 314 on a single host mode port 312, and replacing any current session 394 associated with the single host mode port 312 with a new session 394 for the newly appearing host 314 on the port 312. In this manner, only a single session 394 for a single host 314 is associated with a single host mode port 312. Each time a new host 314 appears on a single host mode port 312, any current session 394 associated with any previous host 314 is replaced with the session 394 of the new host 314 (e.g., by authentication agent 358).

Session replacement agent 368 is adapted to track these session replacements associated with ports 312 of the network device 300 and detect continuous session replacements associated with those ports 312. According to one embodiment, session replacement agent 368 may maintain port session replacement status 382 including an identifier for each (e.g., single host mode) port 312 of the network device 300, along with a corresponding session replacement counter and session replacement timer.

Session replacement agent 368 may thus receive session replacement events when session 394 for a (e.g., single host mode) port 312 is replaced with another session 394 (e.g., by authentication agent 358) for that port. As noted, such a session replacement may occur, for example, when a host 314 unaffiliated with a current session 394 associated with a single host mode port 312 connects to that port 312 and is authenticated (or attempts to authenticate) by authentication agent 358.

When session replacement agent 368 determines a session replacement for a port 312 has occurred, session replacement agent 368 may access the port session replacement status 382 for that port 312 to determine if a session replacement timer associated with that port 312 is running. If no session replacement timer corresponding to that port 312 is running, session replacement agent 368 may start the session replacement timer associated with the port 312. Session replacement agent 368 can compare the session replacement counter associated with the port 312 to a session replacement threshold 374 (e.g., which may be 5 session replacements, 10 session replacements, etc.) configured at the device 300. When the session replacement counter associated with the port 312 exceeds (or meets or exceeds) the session replacement threshold 374 session replacement agent 368 may determine that continuous session replacement on the port 312 is occurring. Based on this detection of continuous session replacement for the port 312 a session replacement action 372 configured at the device 300 may be taken by the session replacement agent 368.

At the expiration of a session replacement time interval 378 configured at the device 300 (e.g., when the timer associated with the port 312 has reached the configured time interval 378 such as 10 seconds, 30 seconds, a minute, etc.) the session replacement counter and timer associated with that port 312 may be reset (e.g., both the session replacement counter and the timer for that port 312 are reset to zero). Namely, when the configured time interval 378 has passed since the timer for that port 312 was started by the session replacement agent 368 based on a session replacement event for that port (e.g., as determined from that timer), the timer associated with port 312 will be stopped and reset (e.g., cleared or reset to zero) and the session replacement counter associated with the port 312 reset (e.g., cleared or reset to zero). The session replacement timer for that port may only be started again by session replacement agent 368 at the occurrence of the next session replacement event associated with that port 312. Accordingly, continuous session replacement may only be detected for a port 312 if a threshold number of session replacements occur within the configured time interval 378.

In this manner, continuous session replacement on a port 312 may be detected and a continuous session replacement action taken based upon such detection. In one embodiment, a continuous session replacement action 372 as configured at the device 300 may be taken by session replacement agent 368 with respect to a port 312 when continuous session replacement is detected on that port 312. This continuous session replacement action may include outputting one or more statements to a system log or error log indicating that there is continuous session replacement associated with the port 312 (e.g., to inform a user of the continuous session replacement issue). Here, the network device 300 may continue to process packets from all the hosts 314 connected to the port 312 and session replacement may continue (e.g., until a user of the network device 300 takes action, such as reconfiguring the port or disconnecting unwanted hosts 314 on the port 312).

Alternatively or additionally, a continuous session replacement action may include disabling the port 312. In instances where the port 312 is disabled, the network device 300 may not process packets from hosts 314 on the port 312 until the port 312 is linked up again, thus avoiding unwanted, redundant, or extraneous processing of traffic from multiple hosts 314 on the port 312. Moreover, in particular embodiments when the continuous session replacement action 372 configured at the device 300 specifies that a port 312 is to be disabled when continuous session replacement is detected on that port 312, the configured continuous session replacement action 372 may also specify whether that port 312 is to be automatically recovered, along with a port recovery time period 376. Accordingly, in cases where session replacement agent 368 disables a port 312, the session replacement agent 368 may automatically recover that port 312 after the amount of time specified by the port recovery time period 376. This recovery may entail re-linking the port 312 so that packets from hosts 314 on that port 312 may once again be processed by network device 300 (e.g., hosts 314 may authenticate and communicate through the port 312).

Thus, by allowing the continuous session replacement action 372 to be configured, embodiments may provide for the automatic detection and flexible handling and remediation of continuous session replacement on individual ports 312. For example, users may configure the network device 300 to simply output notifications of the situation, to disable a port 312, or to disable a port 312 for a limited period of time and then attempt reactivation of the port 312.

Figure 4:
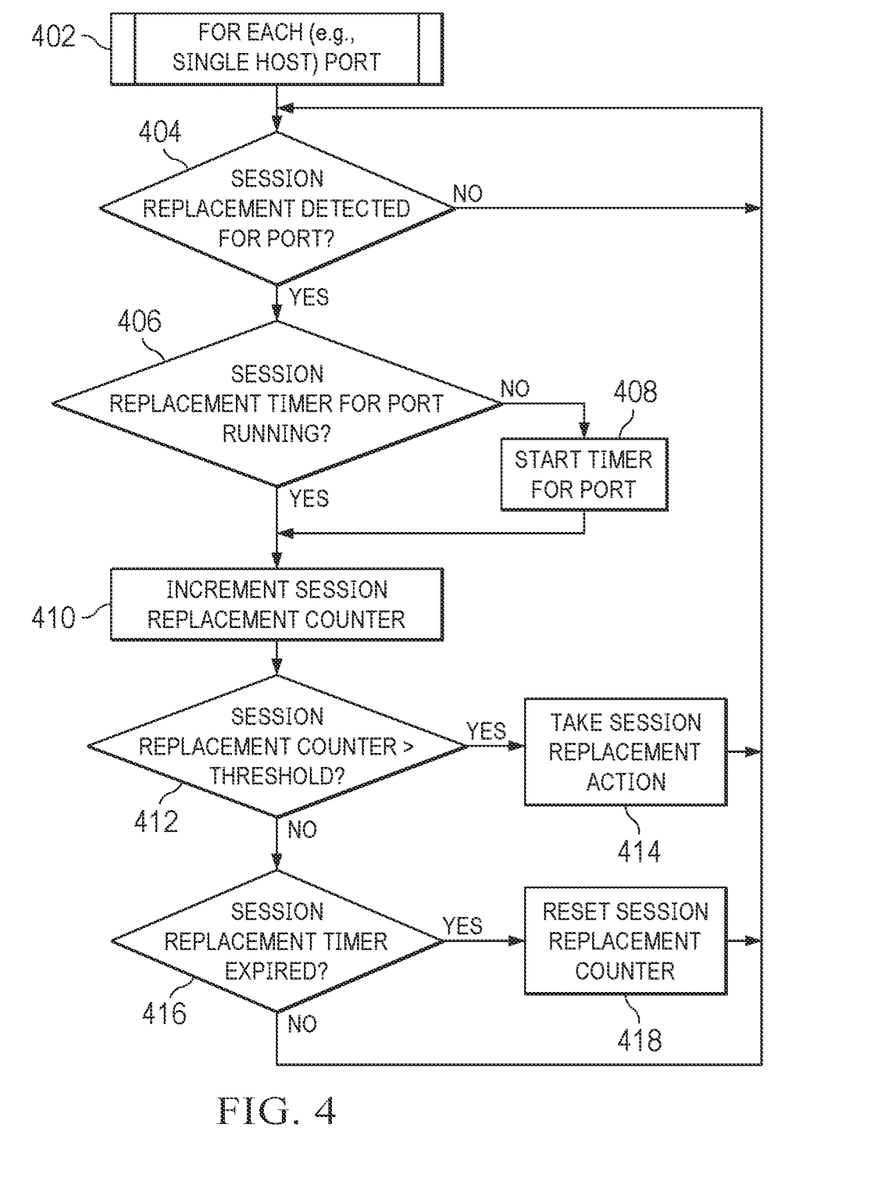
FIG. 4 is a flow diagram for one embodiment of a method for detection of continuous session replacement on ports of a network device.

Turning to FIG. 4 a flow diagrams for an embodiment of a method that may be implemented by a network device for detecting, and acting upon, continuous session replacement depicted. Such continuous session replacement monitoring may be performed for all or a subset of ports at a network device, such as all or a subset of the single host mode ports at the device (STEP 402). Accordingly, for a port being monitored for continuous session detection it can be determined if a session replacement associated with the port has occurred (STEP 404). Such a session replacement may occur, for example, if there is a current session for one host on a single host mode port and another host attempts to authenticate on that port. Such an authentication may be performed, for example, through the use of EAPoL messages, using Media Access Control (MAC) address based authentication, or utilizing another type of authentication. As one example, if there are multiple MAC-Based Authentication (MBA) supplicants continuously replacing one another's session such continuous replacement may also be detected by embodiments.

When it is determined that a session replacement for the port has occurred (Y branch of STEP 404), it can be determined if a session replacement timer associated with that port is running (STEP 406). If no session replacement timer corresponding to that port is running (N branch of STEP 406), the session replacement timer associated with the port can be started (STEP 408). The session replacement counter associated with the port is also incremented (STEP 410) and compared to a session replacement threshold (STEP 412). When the session replacement counter associated with the port exceeds (e.g. or meets or exceeds) the session replacement threshold session it is determined that continuous session replacement on the port has been detected. Based on this detection of continuous session replacement for the port a session replacement action is taken (STEP 414).

A continuous session replacement action may include outputting one or more statements to a system log or error log indicating that there is continuous session replacement associated with the port, disabling the port 312, both outputting a statement to a log and disabling the port, or another type of continuous session replacement action. In instances where the port is disabled, that port may also be automatically recovered after a certain amount of time (i.e., the port recovery time period).

At the expiration of a session replacement time interval (e.g., when the session replacement timer associated with the port has reached the session replacement time interval) the session replacement counter and timer associated with that port may be reset (Y branch of STEP 416 and STEP 418). Thus, when the configured time interval has passed since the timer for that port was started based on a session replacement event for that port (STEP 408), the timer associated with port will be stopped and reset (e.g., cleared or reset to zero) and the session replacement counter associated with the port reset (e.g., cleared or reset to zero). The session replacement timer for that port may only be started again at the occurrence of the next session replacement event associated with that port (Y branch of STEP 404 and N branch of STEP 406). Accordingly, continuous session replacement may only be detected for a port if more than (or a) threshold number of session replacements occur within the session replacement time interval.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method for detecting session replacement at a port of a network device, comprising:
   determining an occurrence of a session replacement associated with a port of a network device, wherein a session replacement comprises replacing a current authenticated session on the port associated with a first host with a subsequent authenticated session on the port associated with a second host;
   based on the occurrence of the session replacement, determining a number of session replacements for that port;
   determining that the number of session replacements for the port exceeds a threshold; and
   based on the determination that the number of session replacements for the port exceeds the threshold, taking a continuous session replacement action for the port at the network device.

2. The method of claim 1, wherein the port is in single host mode.

3. The method of claim 2, wherein the continuous session replacement action is configurable.

4. The method of claim 3, wherein the continuous session replacement action includes disabling the port at the network device or outputting a session replacement error message for the port to an error log.

5. The method of claim 3, wherein the continuous session replacement action comprises recovering the port after a port recovery time period.

6. The method of claim 2, wherein determining a number of session replacements for that port comprises incrementing a session replacement counter maintained for the port based on the determination of the occurrence of a session replacement associated with a port, wherein the session replacement counter comprises the number of session replacements for that port.

7. The method of claim 6, wherein the session replacement counter is reset at the expiration of a timer for a session replacement interval, and wherein the timer is associated with that port.

8. The method of claim 7, wherein the session replacement interval is configurable.

9. The method of claim 7, further comprising:
   determining if the timer for the session replacement interval is running when it is determined that the session replacement associated with the port of the network device occurred; and
   starting the timer when the timer is not running.

10. The method of claim 2, wherein the session replacement occurs in response to authentication of the second host.

11. The method of claim 9, wherein the authentication is based on an Extensible Authentication Protocol (EAP) over LAN (EAPOL) message or a Media Access Control (MAC) address.

12. A network device, comprising:
    a processor;
    a non-transitory computer readable medium, comprising instructions for:
       maintaining a session replacement counter for each of a plurality of single host ports at the network device;
       when a session replacement occurs for a port of the plurality of single host ports by replacing a current authenticated session on the single host port associated with a first host with a subsequent authenticated session on the single host port associated with a second host:
          determining if a timer for a session replacement interval is running, wherein the timer corresponds to the port;
          when the timer for the session replacement interval is not running, starting the timer;
          incrementing a session replacement counter associated with the port;
          determining if the session replacement counter associated with the port exceeds a threshold; and
          when the number of session replacements for the port exceeds the threshold, disabling the port or notifying a user; and
       resetting the timer and the session replacement counter at the expiration of the session replacement interval.

13. The network device of claim 12, wherein the instructions are further for recovering the port after a port recovery time period.

14. The network device of claim 13, wherein the port recovery time period is configurable.

15. The network device of claim 12, wherein notifying a user comprises outputting a session replacement error message for the port to an error log.

16. A non-transitory computer readable medium, comprising instructions for:
   determining an occurrence of a session replacement associated with a single host port of a network device, wherein a session replacement comprises replacing a current authenticated session on the single host port associated with a first host with a subsequent authenticated session on the single host port associated with a second host;
   based on the occurrence of the session replacement, determining a number of session replacements for the port during a session replacement interval;
   determining that the number of session replacements for the port during the session replacement interval exceeds a threshold; and
   based on the determination that the number of session replacements for the port during the session replacement interval exceeds the threshold, taking a continuous session replacement action for the port at the network device.

17. The non-transitory computer readable medium of claim 16, wherein the continuous session replacement action includes disabling the port at the network device or outputting a session replacement error message for the port to an error log.

18. The non-transitory computer readable medium of claim 17, wherein the instructions are further for recovering the port after a port recovery time period.

19. The non-transitory computer readable medium of claim 16, wherein instructions are further for tracking the session replacement interval by starting a timer for the session replacement interval at the occurrence of the session replacement and setting the number of session replacements to zero at the expiration of the timer.

* * * * *